United States Patent
Faccin et al.

(10) Patent No.: US 7,443,106 B2
(45) Date of Patent: Oct. 28, 2008

(54) CIRCUIT WITH SWITCH-OFF DEVICE FOR THE OPERATION OF LIGHT SOURCES

(75) Inventors: Marco Faccin, Caerano (IT); Felix Franck, Munich (DE); Michele Menegazzi, Paese (IT)

(73) Assignee: Patent-Treuhand-Gesellschaft für Elektrische Glühlampen mbH, München (DE)

( * ) Notice: Subject to any disclaimer, the term of this patent is extended or adjusted under 35 U.S.C. 154(b) by 324 days.

(21) Appl. No.: 11/151,352

(22) Filed: Jun. 14, 2005

(65) Prior Publication Data

US 2005/0275356 A1 Dec. 15, 2005

(30) Foreign Application Priority Data

Jun. 15, 2004 (DE) .................. 10 2004 028 798

(51) Int. Cl.
*H05B 37/02* (2006.01)
*H01J 1/04* (2006.01)
*H02M 3/24* (2006.01)
*H01H 9/00* (2006.01)

(52) U.S. Cl. ................... 315/224; 315/209 R; 315/219; 315/225; 315/388; 315/395; 315/127; 315/119; 363/98; 361/160

(58) Field of Classification Search .................. 363/98; 361/160; 315/127, 225, 119, 209 R, 219, 315/224, 388, 395
See application file for complete search history.

(56) References Cited

U.S. PATENT DOCUMENTS

| | | | |
|---|---|---|---|
| 3,800,181 A | * | 3/1974 | Spencer, Jr. .................. 315/388 |
| 3,816,792 A | * | 6/1974 | Spencer, Jr. .................. 315/403 |
| 4,684,851 A | * | 8/1987 | Van Meurs ................... 315/224 |
| 5,493,180 A | * | 2/1996 | Bezdon et al. ................. 315/91 |

(Continued)

FOREIGN PATENT DOCUMENTS

EP 0668647 A1 1/1995

OTHER PUBLICATIONS

European Search Report dated May 17, 2006 from corresponding EP Application No. 05010914.9, 3 pages.

*Primary Examiner*—Matthew V Nguyen
*Assistant Examiner*—Jue Zhang
(74) *Attorney, Agent, or Firm*—Carlo S. Bessone

(57) ABSTRACT

Circuit with a switch-off device for the operation of light sources The invention relates to a circuit with a switch-off device for the operation of light sources (Lp), have the following features:
a self-commutated half-bridge inverter having a series circuit of an upper electronic switch and a lower electronic switch (T1, T2), which are joined at a half-bridge midpoint (M) and are connected between a supply voltage (+) and a ground potential,
a start capacitor (C3) which is joined via a trigger element (DIAC) to a control electrode of the lower electronic switch (T2), and
a switch-off device having an input (E) and an output, which are configured and connected so that they discharge the start capacitor (C3) if a switch-off signal is applied to the input (E). The switch-off device contains a time delay. In order to be able to keep the components in the time delay small, it is proposed that the switch-off device should comprise two successively connected transistor stages (T3, T4) with bipolar transistors, a first stage (T3) being configured as a collector circuit and a second stage (T4) being configured as an emitter circuit. The second stage (T4) may perferable be used to suppress start pulses.

7 Claims, 2 Drawing Sheets

U.S. PATENT DOCUMENTS

| | | | |
|---|---|---|---|
| 5,740,021 A * | 4/1998 | Lecheler et al. | 363/37 |
| 5,825,136 A * | 10/1998 | Rudolph | 315/291 |
| 5,959,408 A * | 9/1999 | Steel et al. | 315/106 |
| 6,028,871 A * | 2/2000 | Vaughan et al. | 372/38.02 |
| 6,169,375 B1 * | 1/2001 | Moisin | 315/291 |
| 6,181,083 B1 * | 1/2001 | Moisin | 315/291 |
| 6,181,085 B1 * | 1/2001 | Nilssen | 315/307 |
| 6,346,779 B1 * | 2/2002 | Aiello | 315/291 |
| 6,580,229 B2 * | 6/2003 | Murakami et al. | 315/224 |
| 6,603,674 B2 * | 8/2003 | Franck et al. | 363/97 |
| 2002/0071299 A1 * | 6/2002 | Franck et al. | 363/97 |
| 2002/0114121 A1 * | 8/2002 | Franck | 361/160 |

* cited by examiner

US 7,443,106 B2

CIRCUIT WITH SWITCH-OFF DEVICE FOR THE OPERATION OF LIGHT SOURCES

FIELD OF THE INVENTION

The invention relates to a circuit with a switch-off device for the operation of light sources. The invention relates in particular to half-bridge inverters for the operation of halogen incandescent lamps.

BACKGROUND OF THE INVENTION

Half-bridge inverters are widely known for the operation of light sources. The half-bridge inverter is fed with a supply voltage, which is a DC voltage. For light sources whose light flux responds only slowly to the electrical energy provided, the DC voltage may be pulsed without impairing the quality of the light. Halogen incandescent lamps represent such a light source. Half-bridge inverters for halogen discharge lamps are therefore generally fed with a rectified mains voltage as the supply voltage, without any smoothing being provided.

It is also widely known that half-bridge inverters for halogen incandescent lamps are embodied as self-commutated inverters for cost reasons. In this context, self-commutated means that a drive signal for electronic switches of the half-bridge is taken from an output circuit. In what follows, the term half-bridge inverter is always intended to mean a self-commutated half-bridge inverter. It consists essentially of the series circuit of an upper electronic switch and a lower electronic switch, which are joined at a half-bridge midpoint and are connected between a supply voltage and a ground potential.

The commutation of the half-bridge inverter has to be started by a start circuit. This is necessary after each mains half-wave since the commutation is broken off when there is a low instantaneous mains voltage. The start circuit consists essentially of a start capacitor and a trigger element. As soon as the voltage at the start capacitor exceeds a trigger threshold, a start pulse is initiated; this means that the trigger element connects the start capacitor to the control electrode of the lower electronic switch. The lower electronic switch is therefore turned on and the commutation of the half-bridge inverter commences. The start capacitor must deliver enough energy for the lower electronic switch to remain reliably turned on for long enough.

So that the circuit is not destroyed in the event of malfunction, and no damage is incurred due to an incorrect load, the circuits in question contain a switch-off device. The switch-off device has an input and output. It is configured and connected so that it discharges the start capacitor if a switch-off signal is applied to the input. The commutation of the half-bridge inverter breaks off at the next mains voltage zero crossing. The switch-off device prevents a restart.

The prior art concerning a circuit with a switch-off device for the operation of light sources will be explained below with reference to FIG. 1. The series circuit of an upper electronic switch T1 and a lower electronic switch T2 is connected between a terminal for a supply voltage, which is denoted by a + sign, and a ground potential. The interconnection node M forms a half-bridge midpoint. The electronic switches are presented as NPN bipolar transistors. It is nevertheless possible to use other electronic switches, for example MOSFETs or IGBTs. An optional freewheel diode is respectively depicted in parallel with each electronic circuit.

The series circuit of two coupling capacitors C7 and C8 is connected in parallel with the series circuit of T1 and T2. There is a second node N2 at the interconnection point between C7 and C8. The half-bridge inverter, which consists essentially of T1, T2, C7 and C8, delivers an AC voltage of high frequency compared with a mains voltage between the second node N2 and the half-bridge midpoint M. The series circuit of the primary winding of a feedback transformer Tr1 and a load Lp is connected to this AC voltage. One coupling capacitor C7 or C8 may be omitted.

The load is represented by a resistor with the reference Lp. In the simplest case, the load may consist merely of an incandescent lamp. Alternatively, low-voltage halogen incandescent lamps may be connected up via a transformer.

By the primary winding, the feedback transformer Tr1 picks up a load current and couples it back via two secondary windings respectively to control electrodes of T1 and T2. A feedback circuit is thereby closed, so that a self-commutating half-bridge inverter is obtained.

A start circuit is formed by a start capacitor C3, a resistor R1 and a trigger element DIAC. C3 and R1 are connected in series between the supply voltage and the ground potential. The DIAC joins the interconnection point of C3 and R1 to the control electrode of the lower electronic switch T2. Via R1, C3 is charged with the supply voltage. If the voltage reaches a value which is more than the threshold voltage of the DIAC, i.e. typically 33 V, then C3 sends a start pulse to the control electrode of T2.

Once the half-bridge inverter is commutating, it is necessary to ensure that no further start pulses arrive from the start circuit, since these would perturb the commutation in progress. In fact, a start pulse while the upper electronic switch is turned on would actually destroy the half-bridge since a so-called cross current is set up. In the prior art according to FIG. 1, this problem is resolved by a diode D11 which joins the start capacitor C3 to the half-bridge midpoint M. As soon as the lower electronic switch is turned on, the start capacitor C3 discharges through the diode D11.

The series circuit of a first limiter diode D7 and a second limiter diode D8 is connected between the supply voltage (+) and the ground potential, the limiter diodes being joined to a third node (N3). The third node N3 is joined to the second node N2. The limiter diodes are intended to prevent the voltage at the coupling capacitors C7 and C8 from changing polarity, so that the potential at the second node N2 does not exceed the supply voltage or fall below the ground potential, in the event of an elevated load current.

In the prior art according to FIG. 1, a switch-off device consists of resistors R3-R6, a capacitor C4, a diode D3 and a transistor T3. The voltage at the second node N2 is used as a switch-off signal. The amplitude of the AC voltage component of the voltage at the second node N2 is a measure of the load current. The circuit is intended to be disabled if the load current exceeds a predetermined limit value.

The voltage at the second node N2 is joined via a fifth capacitor C5 to an input E of the switch-off the device. The AC voltage component of the voltage at N2 is filtered out by C5 and made available at a grounded third resistor R3. The voltage at R3 is rectified by a third diode D3 and charges a fourth capacitor C4 via a fourth resistor R4.

R4 and C4 form a lowpass filter. It is used so that an elevated load current does not lead to a switch-off process until after a predetermined time. This is necessary since, by their very nature, cold filaments of an incandescent lamp lead to an elevated load current. Typically, halogen incandescent lamps do not reach their rated value until about 0.1 sec after switching on.

Connected in parallel with C4, there is a fifth resistor R5 which discharges C4 again after an elevated load current. The voltage at C4 is fed to the base of the transistor T3 via a voltage divider, formed by the resistors R6 and R7. For cost reasons, T3 is generally embodied as a bipolar transistor. If T3 is driven in the event of malfunction, then it short circuits the start capacitor C3 via its collector-emitter path. The voltage divider formed by R6 and R7 adapts the voltage level at C4 to the switch-on threshold of T3. R7 may optionally be omitted.

FIG. 1 represents the way in which a switch-off signal is taken from the node N2 between the coupling capacitors C7 and C8. As an alternative, the current in the lower electronic switch T2 may also be used as a switch-off signal. To this end, a measuring resistor R2 is connected in series with the lower electronic switch T2. The voltage at R2 is fed to the input E of the switch-off device. C5 may be omitted.

One problem with the circuit according to the prior art is the dimensioning of the lowpass filter consisting of R4 and C4. In order to achieve the necessary delay and make sufficient energy available for driving the transistor T3, the capacitor C4 in the prior art typically has values of from 10 to 47 microfarads. These values mean that C4 is very large and expensive compared to other components of the circuit. For these capacitances, furthermore, it is customary to use electrolytic capacitors which age, work only in a restricted temperature range and are difficult to mount in mass production.

SUMMARY OF THE INVENTION

It is an object of the present invention to provide a circuit having a switch-off device for the operation of light sources, which requires only capacitors whose values are less than 10 microfarads in the switch-off device.

This object is achieved by a circuit which, in addition to the circuit according to the prior art as described above, has a second transistor stage in the switch-off device with a bipolar transistor configured as an emitter circuit. This is connected down-stream of the first stage, which is configured as a collector circuit.

The terminology of transistor stages is dictated in the known way according to the transistor electrode which is assigned both to the input of the stage and to the output of the stage. As a rule, this electrode is at the ground potential. The second stage according to the invention in the switch-off device is configured as an emitter circuit; i.e. the emitter of the second stage is joined to the ground potential.

In the literature, the emitter circuit is also referred to as a voltage follower. It has a high input impedance and a low output impedance. Since the output of the first stage must only deliver a small current due to the high input impedance of the second stage, the input of the first stage can have a higher impedance level. In a typical application, the value of C4 may therefore be selected to be about an order of magnitude lower.

The first and second stages preferably contain bipolar transistors of a different types. For example, the first stage contains an NPN transistor and the second stage contains a PNP transistor. This makes it possible to join the two stages directly together. The collector of the first stage may be joined directly to the base of the second stage.

The second stage according to the invention can furthermore be used to suppress start pulses when the half-bridge inverter is commutating. To this end, the base of the transistor of the second stage is coupled with the drive signal of an electronic switch of the half-bridge inverter. Assuming that the electronic switches of the half-bridge inverter are turned on by a positive signal, the following combinations are particularly preferable: PNP transistor in the second stage coupled with the drive signal of the lower electronic switch; NPN transistor in the second stage coupled with the drive signal of the upper electronic switch. In the combinations indicated, the start capacitor is always discharged whenever the upper electronic switch is turned on. This has the advantage that, at the start of the commutation of the half-bridge inverter by a start pulse on the lower electronic switch, the start capacitor is not discharged and sufficient driving of the lower electronic switch is therefore guaranteed. The converse accordingly applies for the rare case in which the start pulse is connected to the upper electronic switch.

The coupling between the drive signal of an electronic switch and the base of the transistor of the second stage is preferably via a capacitor. Potential differences of the coupled circuit points are thereby balanced out. The switching edges of the drive signals are furthermore reacted to, which leads to rapid switching of the second stage.

If the second stage suppresses start pulses as described, the diode 11 in FIG. 1 may be omitted.

BRIEF DESCRIPTION OF THE DRAWINGS

The invention will be explained in more detail below with the aid of exemplary embodiments with reference to the drawings, in which.

In what follows, resistors will be denoted by the letter R, transistors by the letter T, diodes by the letter D, nodes by the letter N and capacitors by the letter C, in each case followed by a number. Furthermore, the same references will be used in what follows for elements which are the same and have the same effect throughout the various exemplary embodiments.

DETAILED DESCRIPTION OF THE INVENTION

Figure 1:
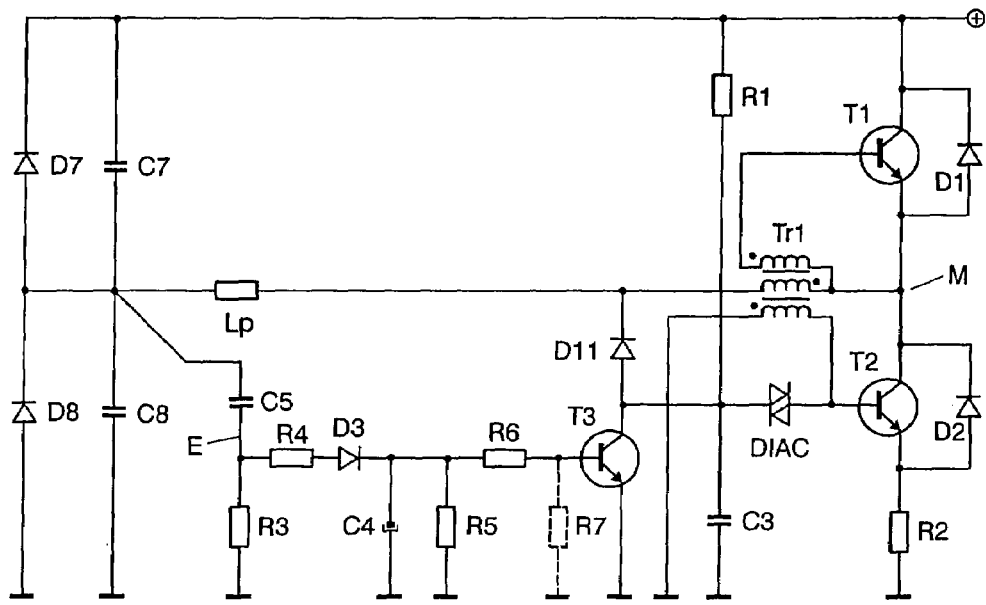
FIG. 1 shows the prior art as described above concerning a circuit with a switch-off device for the operation of light sources.
Figure 2:
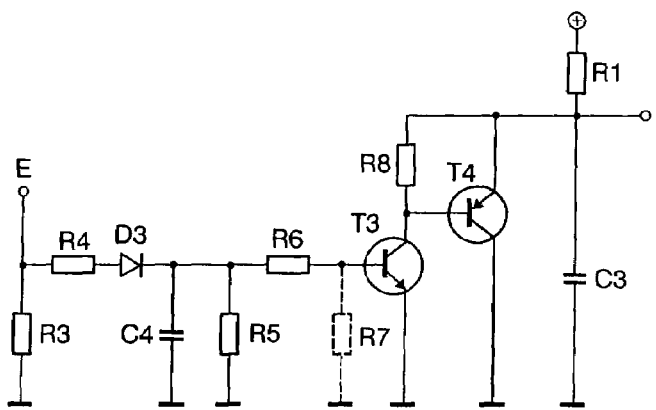
FIG. 2 shows an exemplary embodiment of a circuit according to the invention with a switch-off device for the operation of light sources.

FIG. 2 represents an exemplary embodiment of a circuit according to the invention with a switch-off device for the operation of light sources. In comparison with FIG. 1, which represents the prior art, the switch-off device is expanded by the resistor R8 and the transistor T4. In contrast to the prior art, the collector of the transistor T3 is connected to the start capacitor C3 not directly but via R8. The collector of T4 is joined to the ground potential. T4 is therefore operated as a collector circuit. The emitter of T4 is joined to the start capacitor C3, and the base of T4 is joined to the collector of T3.

T3 forms the first stage as an emitter circuit, and T4 forms the second stage as a collector circuit. Owing to the second stage according to the invention, the collector current required by the first stage is reduced. The base current of the first stage is also thereby reduced, so that the base circuitry of T3 can have a higher impedance level. Values even less than 1 microfarad are therefore possible for the capacitor C4.

The switch-off signal is fed into the switch-off device at an input E. This input is likewise denoted in FIG. 1, where it also corresponds to the input of the switch-off device according to the prior art. The rest of the circuit in FIG. 1 is no longer represented in FIG. 2 since there are no further differences.

Figure 3:
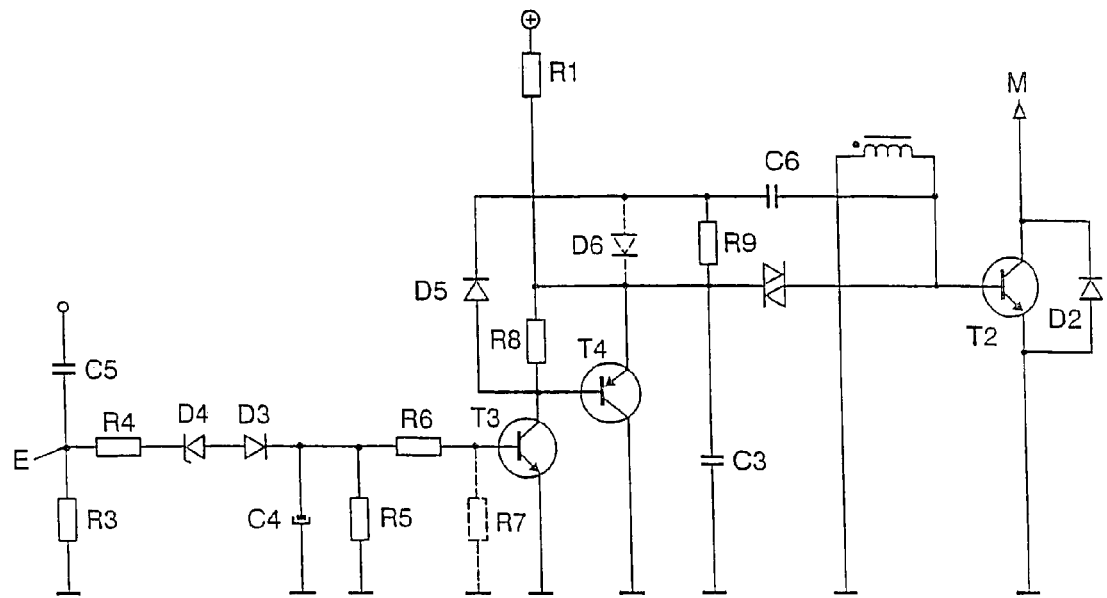
FIG. 3 shows another exemplary embodiment of a circuit according to the invention with a switch-off device for the operation of light sources, with start pulse suppression.

In FIG. 3, the switch-off device of FIG. 2 is expanded by start pulse suppression. The base of T4 is joined to the drive signal of the lower electronic switch T2 of the half-bridge inverter via a series circuit of a capacitor C6 and a diode D5. The node N1 is formed at the interconnection of D5 and C6. N1 is joined via a parallel circuit of a diode D6 and a resistor R9 to the emitter of T4.

While the half-bridge inverter is commutating, there is an AC voltage at the base of the lower electronic switch T2. When T2 switches off, the drive signal of T2 has a falling edge and T4 is driven via C6 and D5. The start capacitor C3 is therefore discharged and a start pulse is suppressed. It is preferable to discharge C3 when T2 is switched off or T1 is turned on. Start-up of the half-bridge inverter is therefore not impeded.

D6 and R9 ensure the charge equilibration of C6. If R9 has a low enough impedance, so that it can provide this charge equilibration by itself, then D6 may be omitted.

In FIG. 3, a Zener diode D4 is additionally connected in series with the diode D3. This makes it possible for a switch-off device to be driven only by a predetermined voltage at the input E.

Figure 4:
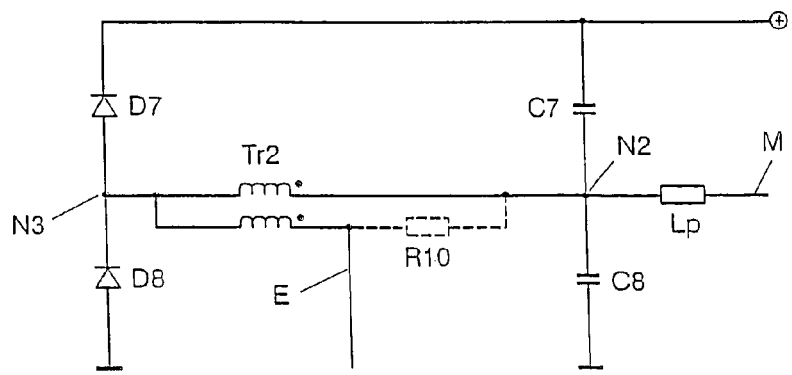
FIG. 4 shows an exemplary embodiment of the provision of a switch-off signal.

FIG. 4 relates to a circuit detail which represents the way in which a switch-off signal can be generated. In the case of a load current which corresponds to normal operation of the circuit, the coupling capacitors C7, C8 are charged and discharged only to the extent that the potential at the node N2 moves between the supply voltage + and the ground potential. In the event of an overload or short circuit, the coupling capacitors C7, C8 are fully discharged or charged with a voltage which is greater than the supply voltage. In this case, a limitation current flows through the limiter diodes D7, D8. In the prior art, the nodes N2 and N3 are joined directly together. In FIG. 4, the primary winding of a measuring transformer Tr2 is connected between N2 and N3. A limitation current can be taken from a secondary winding of the measuring transformer Tr2 and fed to the input E of the switch-off device. A path for a demagnetization current can be provided for the secondary winding via a resistor R10.

The possibility for generating a switch-off signal as represented in FIG. 4 has the advantage that it can discriminate precisely between a normal current and an elevated current, and can deliver a floating-potential switch-off signal.

The invention claimed is:

1. A circuit with a switch-off device for the operation of light sources (Lp), having the following features:
    a self-commutated half-bridge inverter having a series circuit of an upper electronic switch and a lower electronic switch (T1, T2), which are joined at a half-bridge midpoint (M) and are connected between a supply voltage (+) and a ground potential,
    a start capacitor (C3) which is joined via a trigger element (DIAC) to a control electrode of the lower electronic switch (T2), and
    a switch-off device having an input (E) and an output, which are configured and connected so that they discharge the start capacitor (C3) if a switch-off signal is applied to the input (E),
    characterized in that the switch-off device comprises two successively connected transistor stages (T3, T4) with bipolar transistors, a first stage (T3) being configured as an emitter circuit and a second stage (T4) being configured as an collector circuit,
    wherein the collector of the second stage (T4) transistor is not connected to the first stage transistor other than through a ground potential.

2. The circuit with a switch-off device for the operation of light sources (Lp) as claimed in claim 1,
    characterized in that the first stage contains an NPN transistor (T3) and the second stage contains a PNP transistor (T4), the emitter of the PNP transistor being joined to the start capacitor (C3).

3. The circuit with a switch-off device for the operation of light sources as claimed in claim 1, characterized in that the base of the transistor of the second stage (T4) is coupled with the drive signal of an electronic switch (T1, T2) of the half-bridge inverter.

4. The circuit with a switch-off device for the operation of light sources (Lp) as claimed in claim 1, which has the following features:
    the base of the transistor of the second stage (T4) is joined to the anode of a fifth diode (D5),
    the cathode of the fifth diode (D5) is joined to a first node (N1),
    the control terminal of the lower electronic switch (T2) is joined via a sixth capacitor (C6) to the first node (N1),
    the emitter of the transistor of the second stage (T4) is joined a via a ninth resistor (R9) to the first node (N1).

5. The circuit with a switch-off device for the operation of light sources (Lp) as claimed in claim 1, which has the following features:
    the series circuit of a first coupling capacitor and a second coupling capacitor (C7, C8) is connected between the supply voltage (+) and the ground potential, the coupling capacitors (C7, C8) being joined to a second node (N2),
    the series circuit of a first limiter diode and a second limiter diode (D7, D8) is connected between the supply voltage (+) and the ground potential, the limiter diodes (D7, D8) being joined to a third node (N3),
    the second and third nodes (N2, N3) are joined via a current measuring device (Tr2) which sends a switch-off signal to the switch-off device, and the current which flows from the second node (N2) to the third node (N3) is a measure of the value of the switch-off signal.

6. The circuit with a switch-off device for the operation of light sources as claimed in claim 4, characterized in that the current measuring device (Tr2) comprises a measuring transformer (Tr2) with a primary winding and a secondary winding, the primary winding joining together the second and third nodes (N2, N3) and the secondary winding being joined to the input (E) of the switch-off device.

7. The circuit with a switch-off device for the operation of light sources as claimed in claim 2, characterized in that the base of the transistor of the second stage (T4) is coupled with the drive signal of an electronic switch (T1, T2) of the half-bridge inverter.

* * * * *